(12) United States Patent
Dollo et al.

(10) Patent No.: US 7,706,413 B2
(45) Date of Patent: Apr. 27, 2010

(54) SYNCHRONIZATION SYSTEM USING REDUNDANT CLOCK SIGNALS FOR EQUIPMENT OF A SYNCHRONOUS TRANSPORT NETWORK

(75) Inventors: Philippe Dollo, Lannion (FR); Yannick Stephan, Tregastel (FR); Benoit Morin, Perros-Guirec (FR)

(73) Assignee: Alcatel, Paris (FR)

( * ) Notice: Subject to any disclaimer, the term of this patent is extended or adjusted under 35 U.S.C. 154(b) by 1083 days.

(21) Appl. No.: 11/090,596

(22) Filed: Mar. 28, 2005

(65) Prior Publication Data

US 2006/0182211 A1 Aug. 17, 2006

(30) Foreign Application Priority Data

Feb. 15, 2005 (FR) .................................. 05 50429

(51) Int. Cl.
*H04J 3/06* (2006.01)
(52) U.S. Cl. .................. 370/509; 370/516; 370/517; 370/518; 327/141; 327/144; 375/354; 375/373
(58) Field of Classification Search .................. 370/395, 370/426, 507, 516, 517, 304, 350, 503, 504, 370/505, 506, 508, 509, 510, 511, 512, 395.62, 370/518; 375/294, 327, 354, 356, 362, 371, 375/373, 376; 327/145, 147, 156, 291, 141, 327/144, 151; 365/201, 233.1, 233.11, 233.12
See application file for complete search history.

(56) References Cited

U.S. PATENT DOCUMENTS

| 4,282,493 A | | 8/1981 | Moreau et al. | |
|---|---|---|---|---|
| 5,146,585 A | * | 9/1992 | Smith, III | .................. 713/400 |
| 5,475,719 A | * | 12/1995 | Gurtler et al. | ................ 375/376 |
| 5,875,153 A | * | 2/1999 | Hii et al. | .................. 365/233.1 |
| 5,881,113 A | * | 3/1999 | Lee | ............................. 375/354 |
| 6,141,769 A | * | 10/2000 | Petivan et al. | .................. 714/10 |
| 6,163,549 A | * | 12/2000 | Bortolini et al. | ............ 370/503 |

(Continued)

FOREIGN PATENT DOCUMENTS

EP        0 530 3931 A1      3/1993

(Continued)

*Primary Examiner*—Aung S Moe
*Assistant Examiner*—Abdullah Riyami
(74) *Attorney, Agent, or Firm*—Sughrue Mion, PLLC

(57) ABSTRACT

A synchronization system (D) for equipment of a synchronous transport network comprises, firstly, a first synchronization module (MA) comprising i) a first submodule (SM1A) delivering a first intermediate clock signal derived from a first external reference clock signal or an internal reference clock signal, ii) a second submodule (SM2A) delivering a first main reference clock signal derived from the first intermediate clock signal or a second intermediate clock signal, and iii) a third submodule (SM3A) delivering a first output reference clock signal derived from the first main reference clock signal or a second main reference clock signal, and, secondly, a second synchronization module (MB) comprising i) a first submodule (SM1B) delivering the second intermediate clock signal derived from another first external reference clock signal and another internal reference clock signal, ii) a second submodule (SM2B) delivering the second main reference clock signal derived from the first or the second intermediate clock signal, and iii) a third submodule (SM3B) delivering a second output reference clock signal derived from the first or the second main reference clock signal.

14 Claims, 2 Drawing Sheets

U.S. PATENT DOCUMENTS

Figure 1:
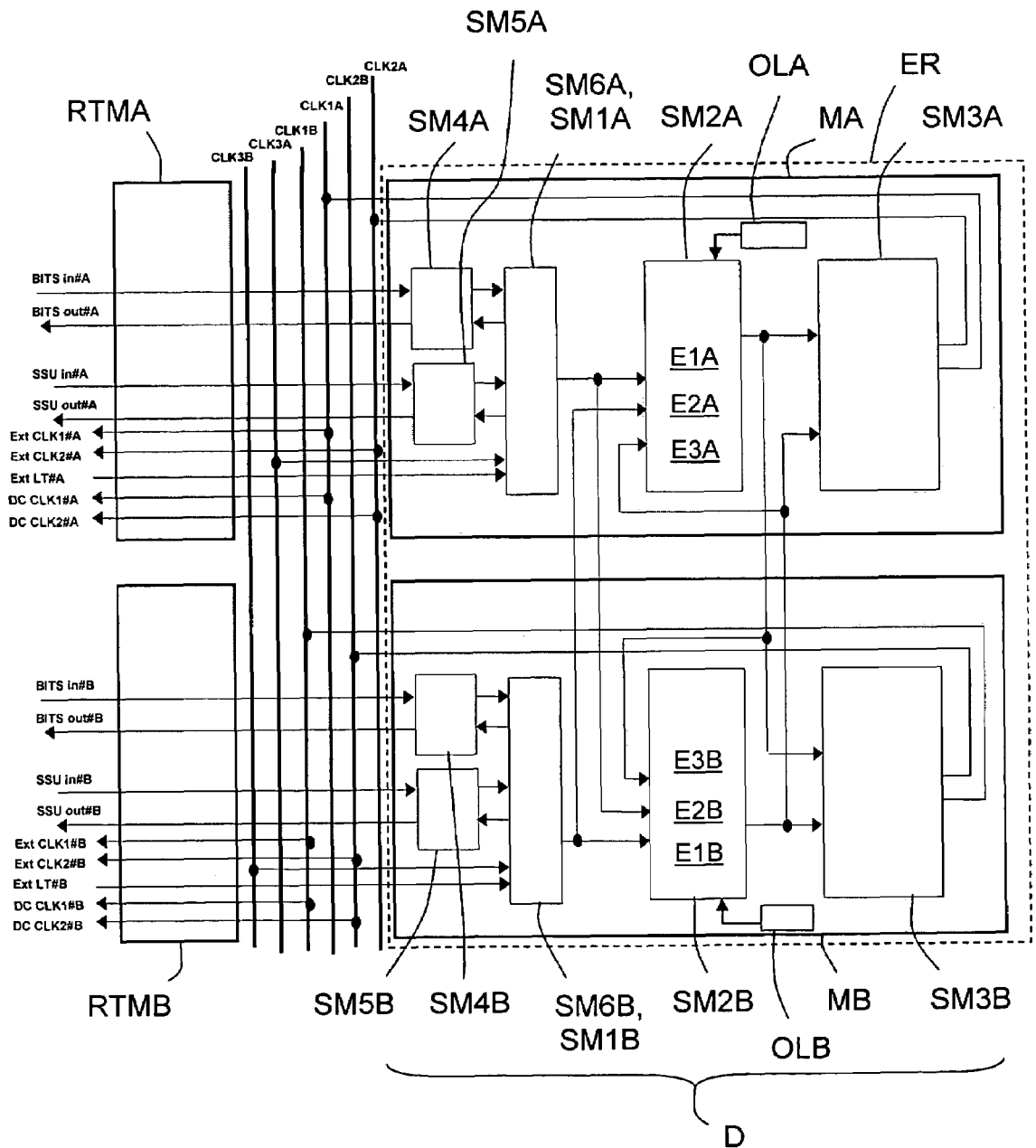

| | | | |
|---|---|---|---|
| 6,339,625 B1* | 1/2002 | Tsuchiya | 375/354 |
| 6,647,081 B2* | 11/2003 | Butler et al. | 375/376 |
| 7,085,237 B1* | 8/2006 | Teodorescu | 370/242 |
| 2001/0017600 A1* | 8/2001 | Torikoshi et al. | 342/357.12 |
| 2004/0006645 A1* | 1/2004 | Dziawa et al. | 709/248 |
| 2004/0012429 A1* | 1/2004 | Lindberg et al. | 327/277 |
| 2004/0145400 A1* | 7/2004 | Mariggis | 327/291 |

FOREIGN PATENT DOCUMENTS

| | | |
|---|---|---|
| EP | 0 982 890 A1 | 3/2000 |
| JP | 5-268202 | 10/1993 |

\* cited by examiner

SYNCHRONIZATION SYSTEM USING REDUNDANT CLOCK SIGNALS FOR EQUIPMENT OF A SYNCHRONOUS TRANSPORT NETWORK

The invention relates to synchronous transport networks, to be more precise to time synchronization systems used in certain equipment of such networks.

In the present context, the expression "synchronous transport networks" means SDH/SONET, TDM, and PDH networks, for example, and their equivalents.

In the present context, the term "equipment" means an item of network equipment of any type that necessitates time synchronization, for example a switch, a radio network controller (RNC), also known as a base station controller (BSC), a media gateway (MGW), an add and drop multiplexer (ADM), or an exchange, possibly of the E10 type.

A time synchronization system supplies reference clock signals (also known as "clock references") to the above equipment in order for it to be able to carry out its time processing, for example processing intended to provide services as reliably as possible or to synchronize a transport network, and is therefore of great importance in synchronous transport networks.

Network equipment of the above type uses Level 3 clock signals (also known as G813 signals in Europe and as Stratum 3 signals in the USA). They are derived from Level 2 clock signals (also known as G812 signals in Europe and as Stratum 2 signals in the USA) that are supplied by equipment known as synchronization supply units (SSU) in Europe and as building integrated timing sources (BITS) in the USA, and are in turn derived from Level 1 clock signals (also known as G811 signals in Europe and as Stratum 1 signals in the USA), supplied by equipment such as atomic clocks. In the present context, Level 1 represents the most accurate level, i.e. the level subject to the lowest time drift.

A synchronous transport network generally includes BITS and/or SSU connected to an atomic clock and to which network equipment including synchronization systems may be connected.

To assure continuity of service within these networks, it is necessary to provide redundancy not only at the level of the network equipment but also at the level of the reference clock signals delivered by the synchronization system. It is preferable for the phase difference between the redundant clock signals to be as small as possible.

Prior art synchronization systems use two synchronization modules, each of which has two input channels for receiving reference clock signals, for example Level 2 reference clock signals, in order to build and deliver a Level 3 reference clock signal, for example. Because each Level 3 reference clock signal is frequently obtained from two Level 2 reference clock signals, these synchronization systems do not provide true redundancy.

Also, prior art synchronization systems employ external intermodule crossover at each input receiving a Level 2 reference clock signal. Consequently, continuity of service may suffer if one of the Level 2 reference clock signals cannot be fed to the synchronization system.

Prior art synchronization systems are not sufficiently reliable and/or effective, and an object of the invention is therefore to improve on this situation, and if possible to offer an improved guarantee of conformance with standards for a greater number of faults.

To this end the invention proposes a synchronization system for synchronous transport network equipment, said system comprising:

a first synchronization module including:
  a first submodule adapted to deliver a first intermediate clock signal selectively defined on the basis of a signal selected from a first external reference clock signal and an internal reference clock signal, where applicable after a change of frequency,
  a second submodule adapted to deliver a first main reference clock signal selectively defined on the basis of a signal selected from the first intermediate clock signal and a second intermediate clock signal, and
  a third submodule adapted to deliver a first output reference clock signal selectively defined on the basis of a signal selected from the first main reference clock signal and a second main reference clock signal, where applicable after a change of frequency, and a second synchronization module including:
  a first submodule adapted to deliver the second intermediate clock signal selectively defined on the basis of a signal selected from another first external reference clock signal and another internal reference clock signal, where applicable after a change of frequency,
  a second submodule adapted to deliver the second main reference clock signal selectively defined on the basis of one of the first and second intermediate clock signals, and
  a third submodule adapted to deliver a second output reference clock signal selectively defined on the basis of one of the first and second main reference clock signals, where applicable after a change of frequency.

The synchronization system of the invention may have other features and in particular the following features, separately or in combination:

the first submodule of the first module may be adapted to deliver the first intermediate clock signal selectively defined on the basis of a signal selected from the first external reference clock signal, a second external reference clock signal, and at least the internal reference clock signal, where applicable after a change of frequency, and the first submodule of the second module may be adapted to deliver the second intermediate clock signal selectively defined on the basis of a signal selected from the other first external reference clock signal, another second external reference clock signal, and at least the other internal reference clock signal, where applicable after a change of frequency;

the first submodule of the first module may instead be adapted to deliver the first intermediate clock signal selectively defined on the basis of a signal selected from the first external reference clock signal, a second external reference clock signal, and at least two internal reference clock signals from different sources, where applicable after a change of frequency, and the first submodule of the second module may be adapted to deliver the second intermediate clock signal selectively defined on the basis of a signal selected from the other first external reference clock signal, another second external reference clock signal, and at least two other internal reference clock signals from different sources, where applicable after a change of frequency;

the first module may further include a fourth submodule adapted to generate the first external reference clock signal from a first external reference clock precursor signal and the second module may further include a fourth submodule adapted to generate the other first external reference clock signal from another first external reference clock precursor signal;

the first module may further include a fifth submodule adapted to generate the second external reference clock signal from a second external reference clock precursor signal and the second module may include a fifth submodule adapted to generate the other second external reference clock signal from another second external reference clock precursor signal;

the first and second external reference clock precursor signals are respectively sourced by a BITS and an SSU, for example;

the first submodule of the first module is adapted to change the frequency of the second external reference clock signal to constitute the first intermediate clock signal, for example, and the first submodule of the second module is adapted to change the frequency of the other second external reference clock signal to constitute the second intermediate clock signal, for example;

the first and second external reference clock precursor signals are instead sourced by an SSU and a BITS, respectively, for example;

the first submodule of the first module is then adapted to change the frequency of the first external reference clock signal to constitute the first intermediate clock signal, for example, and the first submodule of the second module is adapted to change the frequency of the other first external reference clock signal to constitute the second intermediate clock signal, for example;

the second submodule of the first module may have a primary input adapted to receive the first intermediate clock signal, a secondary input adapted to receive the second intermediate clock signal, and a tertiary input adapted to receive the second main reference clock signal, and may be adapted to align the phase of the second main reference clock signal received at the tertiary input to the phase of the first main reference clock signal in such a manner as to make up at least partly any phase difference between the first and second main reference clock signals, and, likewise, the second submodule of the second module may have a primary input adapted to receive the first intermediate clock signal, a secondary input adapted to receive the first intermediate clock signal, and a tertiary input adapted to receive the first main reference clock signal, and may be adapted to align the phase of the first main reference clock signal received at the tertiary input to the phase of the second main reference clock signal in such a manner as to make up at least partly any phase difference between the first and second main reference clock signals;

the third submodule of the first module may have at least two outputs adapted to deliver the first output reference clock signal at two or more different frequencies and, likewise, the third submodule of the second module may have at least two outputs adapted to deliver the second output reference clock signal at two or more different frequencies;

the first module may comprise first selection means adapted to receive each internal reference clock signal and to deliver selectively at an output a received internal reference clock signal, second selection means adapted to receive the internal reference clock signal delivered by the first selection means in order to deliver it selectively to an output connected to the fourth submodule, and/or third selection means adapted to receive the internal reference clock signal delivered by the first selection means in order to deliver it selectively to an output connected to the fifth submodule; the fourth submodule of the first module may be adapted to deliver to an output the internal reference clock signal supplied by the second selection means with a view to external synchronization of the first external reference clock precursor signal to its frequency; and/or the fifth submodule of the first module may be adapted to deliver to an output the internal reference clock signal supplied by the second selection means with a view to external synchronization of the second external reference clock precursor signal to its frequency; likewise, the second module may comprise first selection means adapted to receive each other internal reference clock signal and to deliver selectively at an output another received internal reference clock signal, second selection means adapted to receive the other internal reference clock signal delivered by the first selection means in order to deliver it selectively to an output connected to the fourth submodule, and/or third selection means adapted to receive the other internal reference clock signal delivered by the first selection means in order to deliver it selectively to an output connected to the fifth submodule; the fourth submodule of the second module may be adapted to deliver to an output the other internal reference clock signal supplied by the second selection means with a view to external synchronization of the other external reference clock precursor signal to its frequency; and/or the fifth submodule of the second module may be adapted to deliver to an output the other internal reference clock signal supplied by the second selection means with a view to external synchronization of the other external reference clock precursor signal to its frequency;

the first submodule and the first selection means, the second selection means, and the third selection means of each of the first and second modules are grouped together within a respective sixth submodule, for example;

the second selection means and/or the third selection means of each of the first and second modules may have an input adapted to receive the first output reference clock signal or the second output reference clock signal in such a manner as to feed the fourth submodule and/or the fifth submodule either with the internal reference clock signal delivered by the first selection means or with the first output reference clock signal or the second output reference clock signal;

the third submodule of the first module may be adapted to change the frequency of the first main reference clock signal and/or the second main reference clock signal in such a manner as to constitute the first output reference clock signal and the third submodule of the first module may be adapted to change the frequency of the second main reference clock signal and/or the second main reference clock signal in such a manner as to constitute the second output reference clock signal.

The invention also proposes equipment for a synchronous transport network equipped with a synchronization system of the type described hereinabove.

The invention is particularly suitable, although not exclusively so, for SDH/SONET, TDM and PDH synchronous transport networks.

Figure 2:
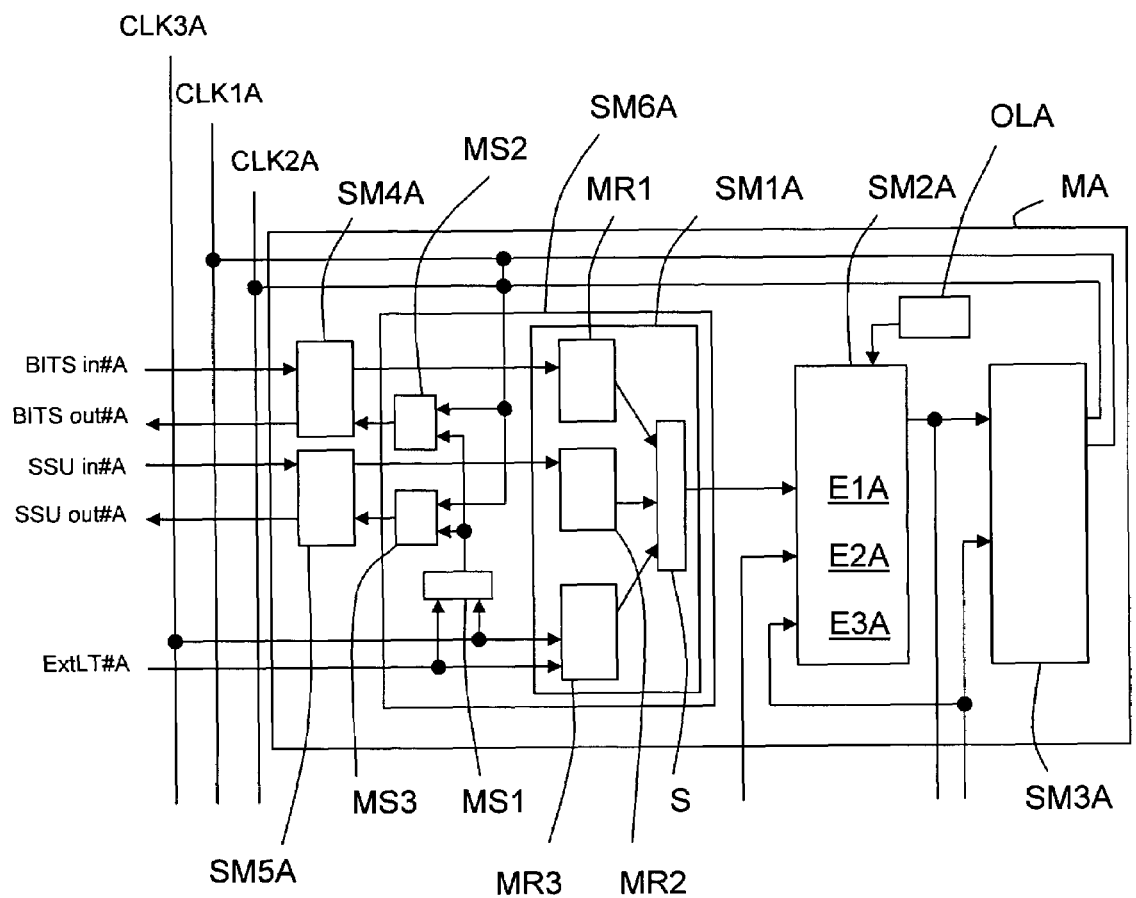

Other features and advantages of the invention will become apparent on reading the following detailed description and examining the appended drawings, in which:

FIG. 1 is a functional block diagram of one embodiment of a synchronization system of the invention, and FIG. 2 is a functional block diagram of one embodiment of a first module MA of the FIG. 1 synchronization system.

The appended drawings constitute part of the description of the invention and may, if necessary, contribute to the definition of the invention.

An object of the invention is to provide effective redundancy of reference clock signals for equipment of a synchronous transport network such as a TDM (time division multiplex) network, a SDH/SONET network, or a PDH (plesiosynchronous digital hierarchy) network.

To this end, the invention proposes a synchronization system intended to be installed in network equipment necessitating redundant time synchronization, for example a switch, a radio network controller (RNC or BSC), a media gateway (MGW), an add/drop multiplexer (ADM), or an exchange, possibly of the E10 type.

As shown in FIG. 1, the synchronization system D may, for example, be installed on a printed circuit card C intended to be connected to rear transition modules (RTM) RTMA and RTMB via a midplane of a shelf of the network equipment.

The synchronization system D of the invention includes two synchronization modules MA and MB that are preferably installed on two different cards of a network equipment ER.

The two synchronization modules MA and MB are substantially identical in functional terms. One is usually the master and the other its slave.

The first synchronization module MA includes three submodules SM1A, SM2A and SM3A.

The first submodule SM1A has a first input intended to receive a first external reference clock signal (for example a Level 2 reference clock signal) and a second input intended to receive either a first internal reference clock signal from a card in the same chassis as the synchronization system D, for example the signal CLK3A, or a signal Ext LT#A from an expansion chassis.

In the non-limiting example represented in FIGS. 1 and 2, the first module MA further includes a fourth submodule SM4A that has an output adapted to feed the first input of the first submodule SM1A with the first external reference clock signal. The fourth submodule SM4A has an input intended to receive a first external reference clock precursor signal from which it generates the first external reference clock signal that is fed to the first submodule SM1A.

In the example shown, the first external reference clock precursor signal is the signal known to the person skilled in the art as the BITS in#A signal, which is delivered by a building integrated timing source (BITS). In this case, the fourth submodule SM4A is adapted to process the first precursor signal received in the form of T1 frames, in order to decode it and to extract from it the timing and the frame used to build the first external reference clock signal. This kind of submodule is often referred to as an LIU+T1 framer.

Alternatively, the first external reference clock precursor signal could be the precursor signal known to the person skilled in the art as the SSU in#A signal, which is delivered by a synchronization supply unit (SSU). In this case, the fourth submodule SM4A is adapted to process the first precursor signal received in order to retrieve the signal degraded by transmission and to build the first external reference clock signal. This processing may also divide the frequency of the first precursor signal received, for example so that it becomes equal to 8 kHz. This kind of submodule is often referred to as a 2 MHz LIU.

In the non-limiting example represented in FIGS. 1 and 2, the first submodule SM1A also has a third input adapted to receive a second external reference clock signal (for example a Level 2 reference clock signal) and a fourth input adapted to receive a either second internal reference clock signal, for example a signal Ext LT#A from an expansion chassis or a signal CLK3A from a card in the same chassis as the synchronization system D.

Moreover, in the non-limiting example represented in FIGS. 1 and 2, the first module MA further includes a fifth submodule SM5A that has an output adapted to feed the third input of the first submodule SM1A with the second external reference clock signal. The fifth submodule SM5A has an input adapted to receive a second external reference clock precursor signal from which it generates the second external reference clock signal that is fed to the first submodule SM1A.

In the present example, the second external reference clock precursor signal is the precursor signal known to the person skilled in the art as the SSU in#A signal, which is delivered by an SSU. In this case, the fifth submodule SM5A is adapted to process the second precursor signal received in order to retrieve the signal degraded by transmission and to build the second external reference clock signal. This processing may also divide the frequency of the second precursor signal received, for example so that it becomes equal to 8 kHz.

Alternatively, the second external reference clock precursor signal could be the precursor signal known to the person skilled in the art as the BITS in#A signal, which is delivered by a BITS. In this case, the fifth submodule SM5A is adapted to process the second precursor signal received in the form of T1 frames in order to decode it and to extract from it the timing and the frame used to build the second external reference clock signal.

Another option that may be envisaged is for each synchronization module MA and MB of the synchronization system D to include fourth and fifth submodules adapted to process precursor signals delivered by two BITS or by two SSU.

Each internal reference clock signal (also known as a line timing signal) has a frequency of 8 kHz, for example, the T1 frames (of the first external reference clock precursor signal) arrive at a bit rate of 1.544 Mbit/s, for example, and are used to generate a first external reference clock signal having a frequency of 8 kHz, for example, and each second external reference clock precursor signal has a frequency of 2 MHz, for example.

As shown in FIG. 2, the first submodule SM1A includes a first receive submodule MR1 for receiving the first external reference clock signal and for delivering a first intermediate clock signal, a second receive submodule MR2 for receiving the second external reference clock signal and for delivering a first intermediate clock signal, where applicable after a change of frequency (from 2 MHz to 8 kHz), if that has not been done by the fifth submodule SM5A, and a third receive submodule MR3 for receiving the internal reference clock signals and for delivering a first intermediate clock signal.

Of course, there could be only two submodules, for example the submodules MR1 and MR3 or the submodules MR2 and MR3.

Each receive submodule MR1, MR2 and MR3 is coupled to a selection submodule S for selecting one of the respective first intermediate clock signals that they deliver, in order to deliver it to an output itself (at the frequency of 8 kHz).

The first submodule SM1A is often referred to as a BITS/SSU/line timing select submodule.

The second submodule SM2A has a primary input E1A adapted to receive the first intermediate clock signal delivered by the output of the first submodule SM1A and a secondary input E2A adapted to receive a second intermediate clock signal delivered by the output of the first submodule SM1B of the second module MB (see below).

In the non-limiting example represented in FIGS. 1 and 2, the second submodule SM2A also has a tertiary input E3A adapted to receive a second main reference clock signal delivered by the output of the second submodule SM2B of the second module MB (see below).

The second submodule SM2A selects one of the signals that it receives at one of its primary and secondary inputs E1A, E2A, and where applicable at its tertiary input E3A, in order to deliver it to an output. In the present context, the signal delivered by the second submodule SM2A is referred to as the first main reference clock signal.

If the first intermediate clock signal is not available at the second submodule SM2A, it is necessary to use the second intermediate clock signal delivered by the first submodule SM1B of the second module MB to generate the first main reference clock signal. As the second intermediate clock signal (which is received at the secondary input E2A) has the phase of the second module MB, it is synchronized in frequency, and where applicable in phase, to the first main reference clock signal.

As proposed by the invention, and as shown in FIGS. 1 and 2, it is preferable to synchronize the phase of the first and second main reference clock signals respectively delivered by the second submodules SM2A and SM2B of the system D. To this end, the second submodule SM2A aligns (preferably progressively) the phase of the second main reference clock signal that it receives at its tertiary input E3A to the phase of the first main reference clock signal that it delivers to its output, in order to make up at least part of any phase difference between them.

PLL (where applicable of digital type) may be used to make up the phase difference, for example.

Thanks to this arrangement of the modules MA and MB, only one internal intermodule crossover needs to be effected. In particular, this limits phase jumps.

The second submodule SM2A is often referred to as a clock generator. For example, it may take the form of an ASIC (where applicable of digital type).

As shown in FIGS. 1 and 2, the second submodule SM2A may be connected to a local oscillator OLA. This guarantees autonomous timing of the first synchronization module MA in the event of the inputs E1A and E2A being interchanged following a fault that has led to the loss of all references.

The third submodule SM3A has a first input adapted to receive the first main reference clock signal (delivered by the output of the second submodule SM2A of its first module MA) and a second input adapted to receive the second main reference clock signal (delivered by the output of the second submodule SM2B of the second module MB).

It delivers to an output a first output reference clock signal that is either the first main reference clock signal it has received, where applicable after a change of frequency, or the second main reference clock signal it has received, where applicable after a change of frequency.

A change of frequency enables the output frequency to be selected. Thus output reference clock signals can be delivered having a frequency of either 8 kHz or 19.44 MHz, for example.

In the non-limiting example shown in FIGS. 1 and 2, the third submodule SM3A may have a plurality of outputs (two outputs in the present example). These outputs deliver first output reference clock signals having different frequencies. In the present example a first output supplies the first output reference clock signal Ext CLK1#A (at 8 kHz, for example) and the second output supplies the first output reference clock signal Ext CLK2#A (at 19.44 MHz, for example).

The third submodule SM3B is often referred to as a reference clock distribution module.

The second synchronization module MB includes three submodules SM1B, SM2B and SM3B.

The first submodule SM1B has a first input adapted to receive another first external reference clock signal (for example a Level 2 reference clock signal) and a second input adapted to receive another first internal reference clock signal, for example the signal CLK3B or the signal Ext LT#B.

In the non-limiting example represented in FIGS. 1 and 2, the second module MB further includes a fourth submodule SM4B that has an output adapted to feed the first input of the first submodule SM1B with the other first external reference clock signal. The fourth submodule SM4B has an input adapted to receive another first external reference clock precursor signal, from which it generates the other first external reference clock signal that is fed to the first submodule SM1B.

In the present example, the other first external reference clock precursor signal is the precursor signal known to the person skilled in the art as the BITS in#B signal, which is delivered by a BITS. In this case, the fourth submodule SM4B is adapted to process the other first external reference clock precursor signal it has received in the form of T1 frames in order to decode it and to extract from it the timing and the frame used to build the other first external reference clock signal. This kind of submodule is often referred to as an LIU+T1 framer.

Alternatively, the other first external reference clock precursor signal could be the precursor signal known to the person skilled in the art as the SSU in#B signal, which is delivered by an SSU. In this case, the fourth submodule SM4A is adapted to process the other first external reference clock precursor signal it has received in order to retrieve the signal degraded by transmission and to build the other first external reference clock signal. This processing may also divide the frequency of the received precursor signal, for example so that it becomes equal to 8 kHz. This kind of submodule is often referred to as a 2 MHz LIU.

In the non-limiting example represented in FIGS. 1 and 2, the first submodule SMLB also has a third input adapted to receive another second external reference clock signal, for example a Level 2 external reference clock signal, and a fourth input adapted to receive another second internal reference clock signal, for example the signal Ext LT#B or the signal CLK3B.

Moreover, in the non-limiting example represented in FIGS. 1 and 2, the second module MB further includes a fifth submodule SM5B that has an output adapted to feed the other second external reference clock signal to the third input of the first submodule SMLB. The fifth submodule SM5B has an input adapted to receive another second external reference clock precursor signal, from which it generates the other second external reference clock signal that is fed to the first submodule SMLB.

In the present example, the other second external reference clock precursor signal is the precursor signal known to the person skilled in the art as the SSU in#B signal, which is delivered by an SSU. In this case, the fifth submodule SM5B is adapted to process the other second external reference clock precursor signal it has received in order to retrieve the signal degraded by transmission and to build the other second external reference clock signal. This processing may also divide the frequency of the received precursor signal, for example so that it becomes equal to 8 kHz.

Alternatively, the other second precursor signal could be the precursor signal known to the person skilled in the art as the BITS in#B signal, which is delivered by a BITS. In this case, the fifth submodule SM5B is adapted to process the other second external reference clock precursor signal it has received in the form of T1 frames in order to decode it and to extract from it the timing and the frame for building the other second external reference clock signal.

The first submodule SM1B includes a first receive submodule MR1 for receiving the other external reference clock signal and for delivering a second intermediate clock signal, a second receive submodule MR2 for receiving the other second external reference clock signal and for delivering a second intermediate clock signal, where applicable after a change of frequency (2 MHz to 8 kHz), if this has not been effected by the fifth submodule SM5A, and a third receive submodule MR3 for receiving the internal reference clock signals and for delivering a second intermediate clock signal.

Of course, there could be only two receive submodules, for example the submodules MR1 and MR3 or the submodules MR2 and MR3.

Each receive submodule MR1, MR2 and MR3 is coupled to a selection submodule S adapted to select one of the respective second intermediate clock signals that they deliver in order to deliver it to an output itself (at the frequency of 8 kHz).

The first submodule SM1B is often referred to as a BITS/SSU/line timing select submodule.

The second submodule SM2B has a primary input E1B adapted to receive the second intermediate clock signal delivered by the output of the first submodule SM1B and a secondary input E2B adapted to receive the first intermediate clock signal delivered by the output of the first submodule SM1A of the first module MA.

In the non-limiting example represented in FIGS. 1 and 2, the second submodule SM2B also has a tertiary input E3B adapted to receive the first main reference clock signal delivered by the output of the second submodule SM2A of the first module MA.

The second submodule SM2B selects one of the signals that it receives at its primary input E1B or its secondary input E2B, and where applicable at its tertiary input E3B, in order to deliver it to an output. This signal delivered by the second submodule SM2B is referred to herein as the second main reference clock signal.

If the second intermediate clock signal is not available at the second submodule SM2B, the first intermediate clock signal delivered by the first submodule SM1A of the first module MA must be used to generate the second main reference clock signal. As the first intermediate clock signal (which is received at the secondary input E2B) has the phase of the first module MA, it is synchronized in frequency, and where applicable in phase, to the second main reference clock signal.

As shown in FIGS. 1 and 2, in accordance with the invention, it is preferable to synchronize the phase of the first and second main reference clock signals delivered by the second submodules SM2A and SM2B, respectively, of the system D. To this end, the second submodule SM2B aligns (preferably progressively) the phase of the first main reference clock signal that it receives at its tertiary input E3B to the phase of the second main reference clock signal that it delivers to its output, in order to make up at least part of any phase difference between them.

For example, PLL (where applicable of digital type) may be used to make up the phase difference.

The second submodule SM2B is often referred to as a clock generator. It may take the form of an ASIC, for example, where applicable of digital type.

As shown in FIGS. 1 and 2, the second submodule SM2B may be connected to a local oscillator OLB. This guarantees autonomous timing of the second synchronization module MB if the inputs E1B and E2B are interchanged following a fault leading to the loss of all references.

The third submodule SM3B has a first input adapted to receive the second main reference clock signal (delivered by the output of the second submodule SM2B of its second module MB) and a second input adapted to receive the first main reference clock signal (delivered by the output of the second submodule SM2A of the first module MA).

It delivers to an output a second output reference clock signal that is either the second main reference clock signal it has received, where applicable after a change of frequency, or the first main reference clock signal it has received, where applicable after a change of frequency.

A change of frequency enables selection of the output frequency. Thus output signals can be delivered having a frequency of either 8 kHz or 19.44 MHz, for example.

In the non-limiting example shown in FIGS. 1 and 2, the third submodule SM3B may have a plurality of outputs (two outputs in this example). The various outputs deliver second output reference clock signals having different frequencies. In the present example, a first output supplies the second output reference clock signal Ext CLK1#B (at 8 kHz, for example) and the second output supplies the second output reference clock signal Ext CLK2#B (at 19.44 MHz, for example).

The third submodule SM3B is often referred to as the reference clock distribution submodule.

The architecture proposed for the synchronization system of the invention assures total redundancy of the reference clock signals that it delivers to its output provided that its synchronization module MA and/or its synchronization module MB receives an external or internal reference clock (precursor) signal.

If a problem arises on the upstream side of the second submodule (clock generator) SM2A of its first module MA, said second submodule SM2A can use the intermediate clock signal that it receives at its secondary input from the first submodule SM1B of the second module MB to deliver a main reference clock signal. Similarly, if a problem arises on the upstream side of the second submodule (clock generator) SM2B of its second module MB, said second submodule SM2B can use the intermediate clock signal that it receives at its secondary input from the first submodule SM1A of the first module MA to deliver a main reference clock signal. Now, if a problem arises on the upstream side of the third submodule (reference clock distribution submodule) SM3A of its first module MA, said third submodule SM3A can use the main reference clock signal that it receives at its second input from the second submodule SM2B of the second module MB to deliver an output reference clock signal. Similarly, if a problem arises on the upstream side of the third submodule SM3B of its second module MB, said third submodule SM3B can use the main reference clock signal that it receives at its second input from the second submodule SM2A of the first module MA to deliver an output reference clock signal. Finally, if a problem arises at the level of the third submodule SM3A of its first module MA, the third submodule SM3B of its second module MB can deliver its main reference clock signal and, likewise, if a problem arises at the level of the third submodule SM3B of its second module MB, the third submodule SM3A of its first module MA can deliver its main reference clock signal.

Each module MA or MB of the synchronization system D can also be adapted to deliver a received internal reference clock signal for synchronizing an external reference clock (precursor) signal to its frequency.

To this end, as shown in FIG. 2, each module MA or MB may include:
- a first selection submodule MS1 for receiving each internal reference clock signal (here the signals Ext LT#A and CLK3A or Ext LT#B and CLK3B) in order selectively to deliver one of them to an output,
- a second selection submodule MS2 for receiving the internal reference clock signal delivered by the first selection submodule MS1 in order selectively to deliver it to an output connected to the corresponding fourth submodule SM4A or SM4B, and/or
- a third selection submodule MS3 for receiving the internal reference clock signal delivered by the first selection submodule MS1 in order selectively to deliver it to an output connected to the corresponding fifth submodule SM5A or SM5B.

Each fourth submodule SM4A or SM4B then delivers at an output (here the output BITS out#A or BITS out#B) the internal reference clock signal ExtLT#A (or ExtLT#B) or CLK3A (or CLK3B) supplied to it by the second selection submodule MS2 in order for it to be used by the equipment that delivers the first external reference clock signal to synchronize that equipment to its frequency. The frequency of the internal reference clock signal used for external synchronization is 8 kHz, for example.

Similarly, each fifth submodule SM5A or SM5B may deliver to an output (here the output SSU out#A or SSU out#B) the internal reference clock signal ExtLT#A (or ExtLT#B) or CLK3A (or CLK3B) supplied to it by the second selection submodule MS2 in order for it to be used by the equipment that delivers the second external reference clock precursor signal to synchronize that equipment to its frequency. The frequency of the internal reference clock signal used for external synchronization is 8 kHz, for example.

As shown by way of non-limiting example in FIG. 2, the second selection submodule MS2 of each of the first and second synchronization modules MA and MB may have a second input for receiving the first output reference clock signal CLK1A(B) or CLK2A(B) delivered by one of the outputs of the third submodule SM3A(B). It can therefore feed the fourth submodule SM4A(B) either with the internal reference clock signal delivered by the first selection submodule MS1 or with the first output reference clock signal CLK1A(B) or CLK2A(B). The fourth submodule SM4A(B) can then selectively deliver to the output BITS out#A(B) the output reference clock signal CLK1A(B) or CLK2A(B) in order for the quality of the synchronization effected by the module MA or MB to be measured.

Instead of this, or in addition to this, the third selection submodule MS3 of each of the first and second synchronization modules MA and MB can also have a second input for receiving the first output reference clock signal CLK1A(B) or CLK2A(B) delivered by one of the outputs of the third submodule SM3A(B). Thus it can feed the fifth submodule SM5A(B) with either the internal reference clock signal delivered by the first selection submodule MS1 or the second output reference clock signal CLK1A(B) or CLK2A(B). The fifth submodule SM5A(B) can then selectively deliver to the output SSU out#A(B) the output reference clock signal CLK1A(B) or CLK2A(B) in order for the quality of the synchronization effected by the module MA or MB to be measured.

Moreover, as is also shown by way of non-limiting example in FIG. 2, the first submodule SM1A or SM1B and the first, second and third selection submodules MS1, MS2, MS3 of each of the first and second modules MA and MB may be grouped together in a sixth submodule SM6A or SM6B. However, the first, second and third selection submodules MS1, MS2, MS3 of each of the first and second modules MA and MB could instead be interleaved between the first submodule SM1A or SM1B and the fourth submodule SM4A or SM4B and the fifth submodule SM5A or SM5B.

In the context of an aTCA type architecture, crossovers can use what the person skilled in the art refers to as update channels provided by midplanes for interconnecting the cards.

The invention is not limited to the embodiments of a synchronization system and network equipment described hereinabove by way of example only, but encompasses all variants thereof that the person skilled in the art might envisage that fall within the scope of the following claims.

Thus there is described hereinabove one embodiment of a synchronization system in which each synchronization module further includes a fourth submodule (SM4A or SM4B) and a fifth submodule (SM5A or SM5B). This provides a system adapted to all known situations. Of course, if only one of the two submodules is necessary, the other is not used. However, there may also be envisaged a variant in which the synchronization system does not include a fifth submodule, in which case the fourth submodule is adapted to process either BITS type signals or SSU type signals.

Moreover, the invention relates to any telecommunication application necessitating a reliable synchronization reference.

What is claimed is:

1. A synchronization system for synchronous transport network equipment, the system comprising:
   a first synchronization module comprising i) a first submodule that delivers a first intermediate clock signal selectively defined on the basis of a signal selected from a first external reference clock signal and an internal reference clock signal, where applicable after a change of frequency, ii) a second submodule that delivers a first main reference clock signal selectively defined on the basis of a signal selected from said first intermediate clock signal and a second intermediate clock signal, and iii) a third submodule that delivers a first output reference clock signal selectively defined on the basis of a signal selected from said first main reference clock signal and a second main reference clock signal, where applicable after a change of frequency, and
   a second synchronization module comprising i) a first submodule that delivers said second intermediate clock signal selectively defined on the basis of a signal selected from another first external reference clock signal and another internal reference clock signal, where applicable after a change of frequency, ii) a second submodule that delivers said second main reference clock signal selectively defined on the basis of one of said first and second intermediate clock signals, and iii) a third submodule that delivers a second output reference clock signal selectively defined on the basis of one of said first and second main reference clock signals, where applicable after a change of frequency;
   wherein said first submodule of said first module delivers said first intermediate clock signal selectively defined on the basis of a signal selected from at least said first external reference clock signal and a second external reference clock signal, where applicable after a change of frequency, and said first submodule of said second module delivers said second intermediate clock signal selectively defined on the basis of a signal selected from at least said other first external reference clock signal and another second external reference clock signal, where applicable after a change of frequency;

wherein: said second submodule of said first module i) has a primary input receives said first intermediate clock signal, a secondary input receives said second intermediate clock signal, and a tertiary input receives said second main reference clock signal, and ii) aligns the phase of said second main reference clock signal received at said tertiary input to the phase of said first main reference clock signal in such a manner as to make up at least partly any phase difference between said second and first main reference clock signals, and said second submodule of said second module i) has a primary input receives said first intermediate clock signal, a secondary input receives said first intermediate clock signal, and a tertiary input receives said first main reference clock signal, and ii) aligns the phase of said first main reference clock signal received at said tertiary input to the phase of said second main reference clock signal in such a manner as to make up at least partly any phase difference between said first and second main reference clock signals.

2. A system according to claim 1, wherein said first submodule of said first module delivers said first intermediate clock signal selectively defined on the basis of a signal selected from said first external reference clock signal, the second external reference clock signal, and at least two internal reference clock signals from different sources, where applicable after a change of frequency, and said first submodule of said second module delivers said second intermediate clock signal selectively defined on the basis of a signal selected from said other first external reference clock signal, said another second external reference clock signal, and at least two other internal reference clock signals from different sources, where applicable after a change of frequency.

3. A system according to claim 1, wherein said first module further includes a fourth submodule that generates said first external reference clock signal from a first external reference clock precursor signal and said second module further includes a fourth submodule that generates said other first external reference clock signal from another first external reference clock precursor signal.

4. A system according to claim 1, wherein said first module further includes a fifth submodule that generates said second external reference clock signal from a second external reference clock precursor signal and said second module further includes a fifth submodule that generates said other second external reference clock signal from another second external reference clock precursor signal.

5. A system according to claim 3, wherein said first and second external reference clock precursor signals are respectively sourced by a BITS and an SSU.

6. A system according to claim 5, wherein said first submodule of said first module changes the frequency of said second external reference clock signal to constitute said first intermediate clock signal and said first submodule of said second module changes the frequency of said other second external reference clock signal to constitute said second intermediate clock signal.

7. A system according to claim 3, wherein said first and second external reference clock precursor signals are respectively sourced by an SSU and a BITS.

8. A system according to claim 7, wherein said first submodule of said first module changes the frequency of said first external reference clock signal to constitute said first intermediate clock signal and said first submodule of said second module changes the frequency of said other first external reference clock signal to constitute said second intermediate clock signal.

9. A system according to claim 3, wherein said third submodule of said first module has at least two outputs that deliver said first output reference clock signal at two or more different frequencies and said third submodule of said second module has at least two outputs that deliver said second output reference clock signal at two or more different frequencies.

10. A system according to claim 3, wherein:
said first module includes first selection means that receive each internal reference clock signal and deliver selectively at an output a received internal reference clock signal, second selection means that receives said internal reference clock signal delivered by said first selection means in order to deliver it selectively to an output connected to said fourth submodule, and/or third selection means that receives said internal reference clock signal delivered by said first selection means in order to deliver it selectively to an output connected to the fifth submodule,
said fourth submodule of the first module that delivers to an output said internal reference clock signal supplied by said second selection means with a view to external synchronization of said first external reference clock precursor signal to its frequency, and/or
said fifth submodule of the first module that delivers to an output said internal reference clock signal supplied by said second selection means with a view to external synchronization of the second external reference clock precursor signal to its frequency,
said second module includes first selection means that receives each other internal reference clock signal and to deliver selectively at an output another received internal reference clock signal, second selection means that receives said other internal reference clock signal delivered by said first selection means in order to deliver it selectively to an output connected to said fourth submodule, and/or third selection means that receives said other internal reference clock signal delivered by said first selection means in order to deliver it selectively to an output connected to said fifth submodule,
said fourth submodule of the second module that delievers to an output said other internal reference clock signal supplied by said second selection means with a view to external synchronization of said other external reference clock precursor signal to its frequency, and/or
said fifth submodule of the second module delivers to an output said other internal reference clock signal supplied by said second selection means with a view to external synchronization of said other external reference clock precursor signal to its frequency.

11. A system according to claim 10, wherein said first submodule and said first selection means, said second selection means and said third selection means of each of said first module and said second module are respectively grouped together within a respective sixth submodule.

12. A system according to claim 10, wherein said second selection means and/or said third selection means of each of said first module and said second module has an input that receives said first output signal or said second output signal in such a manner as to feed the fourth submodule and/or the fifth submodule either with said internal reference clock signal delivered by said first selection means or with said first output signal or said second output signal.

13. A system according to claim 1, wherein said third submodule of said first module changes the frequency of said first main reference clock signal and/or said second main reference clock signal in such a manner as to constitute said first output reference clock signal and said third submodule of said first module changes the frequency of said second main reference clock signal and/or said second main reference clock signal in such a manner as to constitute said second output reference clock signal.

14. Equipment for a synchronous transport network, comprising a synchronization system according to claim 1.

* * * * *